UNITED STATES PATENT OFFICE.

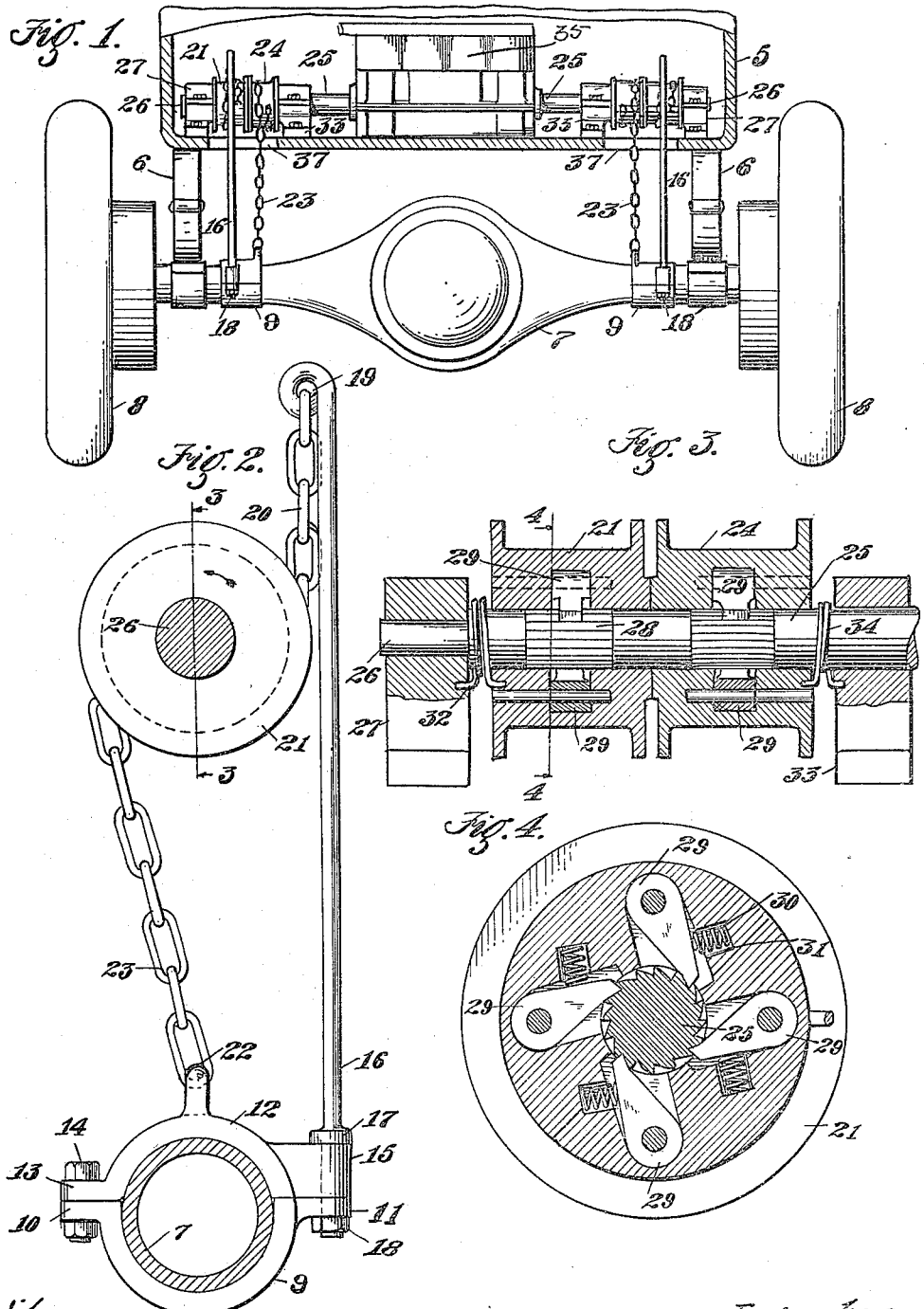

PETER W. KANE, OF SAN PEDRO, CALIFORNIA.

SHOCK-ABSORBER.

1,167,305.

Specification of Letters Patent.

Patented Jan. 4, 1916.

Application filed March 1, 1915. Serial No. 11,119.

*To all whom it may concern:*

Be it known that I, PETER W. KANE, a citizen of the United States, residing at San Pedro, in the county of Los Angeles and State of California, have invented new and useful Improvements in Shock-Absorbers, of which the following is a specification.

This invention relates to shock absorbers for vehicles, and particularly to adjustable shock absorbers for automobiles.

It is an object of this invention to provide a shock absorber which can be adjusted as to its resilient effect.

It is another object to provide a shock absorber which may be mounted in the body of a vehicle and secured by flexible means to the axle.

It is a still further object of my invention to provide a shock absorber for a vehicle in which the energy produced by vibration of the vehicle will be saved and made available for useful purposes.

Shock absorbers heretofore installed on vehicles have employed frictionally engaged parts which wear excessively and must be renewed frequently. Buffer springs have been employed in some instances, but these are objectionable as they are difficult to adjust for different loads and weights of the body. Pneumatic dash pots which have also been employed waste the energy produced by the shock but permit adjustment of the resiliency. Devices of the above character are commonly mounted on the springs and exposed to the dust and dirt, which interferes with their operation.

My device provides a shock absorber which is connected to a power generator. The power generator is mounted in the body of the vehicle, thus being protected from the dirt, and a flexible connection secures the axle to the operating mechanism of the generator, thus providing for side tilting of the vehicle. The vibration of the vehicle is used for operating the generator, the power being stored in some suitable receiver and used for various purposes such as inflating tires or starting the motor. The resistance against which the generator works may be also adjusted, thus providing means for varying the resilient effect of the absorber.

For a full understanding of my invention a detail description of a preferred construction embodying my invention will now be given in connection with the accompanying drawing which forms a part of my specification, and in which:

Figure 1 is a view in rear elevation of an embodiment of my invention attached to the driving axle of an automobile. Fig. 2 is a view in side elevation of a detail of the operating means. Fig. 3 is a view in vertical section on the line 3—3 of Fig. 2. Fig. 4 is a view in vertical section on the line 4—4 of Fig. 3.

More specifically, a vehicle body is indicated by 5 mounted upon elliptical springs 6 which are carried upon an axle 7. Axle 7 is a driving axle carrying preferably a divided floating axle upon the ends of which are mounted the usual wheels 8. Secured adjacent the ends of the axle 7 are preferably divided collars each of which consists of a member 9 having apertured flanges 10 and 11 for the reception of bolts. A member 12 having an apertured flange 13 registering with the aperture in flange 10, is secured thereto by means of a bolt 14. Member 12 has secured thereon an apertured lug 15 registering with the aperture in flange 11. A rod 16 having a shoulder 17 is secured to members 9 and 12; a nut in coöperation with the threaded end of rod 16 serving to fasten members 9 and 12 together and against shoulder 17. Rod 16 extends upwardly and is bent at the end to form an eye 19 to which is secured a chain 20; the latter being passed about a grooved spool 21.

Secured upon the upper side of member 12 and preferably integral therewith is member 22 having an eye to which is secured a chain 23. The other end of chain 23 is passed about the grooved spool 24 and is secured thereto.

Spools 21 and 24 are mounted for rotation upon the rotatable shaft 25 of a power generator 35, here shown as an air compressor, but which might be a hydraulic pump or an electric generator. Shaft 25 is reduced in diameter at one end 26 a shoulder being formed thereon, the reduced end 26 being mounted in a bearing block 27. Upon shaft 25 are ratchet teeth 28 which are engaged by pawls 29 having springs 30 abutting the pawl and mounted in a recess 31 of the spool, the springs 30 pressing pawls 29 into engagement with the ratchet teeth.

Mounted between bearing block 27 and spool 21 is a spiral spring 32 encircling the shaft 25 and attached at one end to spool 21 and at the other end to bearing block 27, tending to rotate the spool 21 when moved in either direction from its normal position. Spool 24 is in a similar manner secured to bearing block 33 by means of a spiral spring 34. The pawls 29 are preferably mounted on pins which may be removed and inserted from one side of the spool. Shaft 25 is the rotating shaft of a compressor which may be of the rotary pump type or of the reciprocating type, and indicated conventionally by 35. The compressor is connected to an air receiver not shown.

In the use of the vehicle the vibration of the body 5 toward the axle 7 causes shaft 25 to move toward the axle carrying with it the spools 21 and 24, the chain 20 being secured at one end to a point fixed with respect to the axle unwinds from the spools 21 causing it to rotate. In its rotation the pawls 29 engage with the ratchet teeth 28 causing the shaft 25 to move with the spool in the direction of the arrow in Fig. 2. At the same time chain 23 has been slackened by the shaft 25 approaching the axle 7, and the slack is wound upon the spool 24 by the spring 34 rotating the spool in the direction opposite to the arrow, pawls 29 disengaging from the teeth 28 and having no tendency to rotate the axle.

Upon the vibration of the vehicle body 5 away from the axle 7 shaft 25 moves away from the axle tightening the chain 23, and causing it to unwind from the spool 24, rotating it. The pawls 29 engage the ratchet teeth 28, thereby rotating the shaft 25; at the same time spring 32 causes the spool 21 to wind chain 20 upon it, the pawls 29 disengaging the ratchet teeth and the spool rotating freely about the shaft. It is thus seen that rotation of the shaft 25 is continuously in one direction, which is most suitable for the operation of compressors. It will also be noted that by reason of the flexible chain construction one side of the body 5 may move nearer the axle 7 than the other. Slots 37 in the vehicle body allowing for relative side movement of the rods 16, with respect to the vehicle body and the flexible chains 23 and 20 forming a secure attachment to the axle.

What I claim is:

1. A shock absorber, comprising in combination a standard secured to the axle of a vehicle, a flexible member secured at one end to said standard and at the other end to a spool, a second flexible member secured at one end to the axle and at the other end to a second spool, a power generator mounted on the body of the vehicle and having a rotary shaft, clutch means securing said rotary shaft and one spool for rotation in one direction, and another clutch means securing said rotary shaft and the other spool for rotation in the same direction.

2. A shock absorber, comprising in combination a coupling attachment fixed to the axle of a vehicle, a standard secured thereto, a flexible member secured at one end to said standard and at the other end to a spool, a second flexible member secured at one end to the axle and at the other end to a spool, a power generator mounted on the body of a vehicle and having a rotary shaft, clutch means securing said rotary shaft and one spool for rotation in one direction, and another clutch means securing said rotary shaft and the other spool for rotation in the same direction.

3. A shock absorber, comprising in combination a standard secured to the axle of a vehicle, a flexible member secured at one end to said standard and encompassing a spool and attached thereto, a second flexible member secured to the attachment coupling encompassing a second spool in the opposite direction and secured thereto, a power generator provided with a rotary shaft mounted on the body of the vehicle, clutch means securing said rotary shaft and one spool for rotation in one direction, and another clutch means securing said rotary shaft and the other spool for rotation in the same direction.

4. A shock absorber, comprising in combination a standard secured to the axle of a vehicle, a flexible member secured at one end to said standard and attached to a spool at the other end, a second flexible member secured at one end to the axle and at the other end to a second spool, a power generator having a rotary shaft mounted on the body of the vehicle, ratchet teeth on said shaft and pawls in said spools engaging said ratchet teeth.

In witness that I claim the foregoing I have hereunto subscribed my name this 15th day of February, 1915.

PETER W. KANE.

Witnesses:
RAY E. BRADFORD,
J. W. WALTON.